United States Patent
Kim

(10) Patent No.: US 7,421,941 B2
(45) Date of Patent: Sep. 9, 2008

(54) DOMESTIC PORRIDGE MAKING APPLIANCE AND METHOD FOR MAKING PORRIDGE BY USING THE SAME

(76) Inventor: Hong-Bae Kim, 5-7, Hyeonchoen-dong, Dukyang-gu, Koyang-si, Kyonggi-do 412-190 (KR)

(*) Notice: Subject to any disclaimer, the term of this patent is extended or adjusted under 35 U.S.C. 154(b) by 814 days.

(21) Appl. No.: 10/843,905

(22) Filed: May 12, 2004

(65) Prior Publication Data

US 2005/0072310 A1  Apr. 7, 2005

(30) Foreign Application Priority Data

Oct. 1, 2003  (KR)  .................. 10-2003-0068301
Feb. 24, 2004  (KR)  .................. 10-2004-0012149

(51) Int. Cl.
*A23C 3/02* (2006.01)
*A23L 1/20* (2006.01)
*A47J 43/044* (2006.01)
*B01F 7/20* (2006.01)

(52) U.S. Cl. .................. 99/337; 99/281; 99/348; 99/510

(58) Field of Classification Search .................. 99/281, 99/285, 286, 287, 348, 483, 510; 366/146, 366/251, 249
See application file for complete search history.

(56) References Cited

U.S. PATENT DOCUMENTS

| | | | | |
|---|---|---|---|---|
| 1,873,023 A * | 8/1932 | Peirce | .................. | 99/319 |
| 3,965,806 A | 6/1976 | Brunner et al. | .................. | 99/331 |
| 4,151,792 A * | 5/1979 | Nearhood | .................. | 99/348 |
| 5,534,042 A | 7/1996 | Tsuchida | .................. | 71/9 |
| 5,852,965 A | 12/1998 | Kim | .................. | 99/281 |
| 6,155,161 A * | 12/2000 | Chan | .................. | 99/348 |
| 6,247,393 B1 | 6/2001 | Chang | .................. | 99/348 |
| 6,345,572 B1 * | 2/2002 | Kao | .................. | 99/337 |
| 7,279,660 B2 * | 10/2007 | Long et al. | .................. | 219/441 |

FOREIGN PATENT DOCUMENTS

| | | |
|---|---|---|
| EP | 1 332 681 A1 | 8/2003 |
| GB | 242455 | 11/1925 |
| JP | 10-185131 | 4/1998 |
| JP | 3651685 B2 | 3/2005 |
| TW | 475886 | 2/2002 |

* cited by examiner

Primary Examiner—Reginald L Alexander
(74) Attorney, Agent, or Firm—Cantor Colburn LLP

(57) ABSTRACT

According to the present invention, there is provided a domestic porridge making appliance comprising a generally cylindrical cooking vessel into which a predetermined amount of water and porridge ingredients are put and having an upper side opened, a vessel handle grip formed at one side thereof for moving the cooking vessel, and a locking part mounted at both ends of the opened upper side thereof, respectively, and a driving part having a lower surface formed to correspond to the opened upper side of the cooking vessel, a locking protrusion formed at a position corresponding to the locking part of the cooking vessel at both ends of the outer peripheral surface thereof, respectively, a motor disposed on the bottom surface thereof in such a manner as to be inserted into the inside of the cooking vessel, the motor having a pulverizing blade connected to an end of a rotating shaft thereof, a heater formed at the outside of the pulverizing blade for heating the water in the cooking vessel, and a controller formed at the inside thereof for controlling the motor and the heater.

5 Claims, 6 Drawing Sheets

DOMESTIC PORRIDGE MAKING APPLIANCE AND METHOD FOR MAKING PORRIDGE BY USING THE SAME

BACKGROUND OF THE INVENTION

1. Field of the Invention

The present invention relates to porridge making appliance, and more particularly, to a domestic porridge making appliance and a method for making porridge by using the same wherein a pulverizing means for pulverizing all kinds of grains like rice as one of main ingredients of the porridge together with various vegetables and a heating means for heating water and porridge ingredients are formed integrally with each other, thereby making it possible to prepare the porridge in a more convenient way.

2. Background of the Related Art

Generally, porridge is widely used for food use of patients who are ill or are in a recovering stage, for the health of old people or children, for stimulating people's appetite when they have a poor appetite, and sometimes for famine-relieving product at a time of want of food. From this viewpoint, therefore, the porridge is a basic form in cooking grains.

The kinds of porridge are rice porridge, rice and milk mixed porridge, nut porridge (porridge made of rice and pine nuts, sesame, walnuts, jujubes, dried chestnuts or the like), green beans or other porridge (porridge made of beans, red beans, mung beans, barley, unripe barley or the like), sea food porridge (porridge made of raw oysters, abalones, mussels, clams or the like), and meat porridge (porridge made of a variety of birds and meats or porridge made of beef and mussels).

In addition to the above mentioned kinds of porridge, there is porridge that is made of starch powder and adlay, lotus roots, water chestnuts, arrowroots, yams or the like, which gives extraordinary tastes, diet effects, and medical effects. And, there is porridge that is made of rice and various vegetables like bean sprouts, mallows, dried radish leaves or the like, which is cooked for stimulating poor appetites.

Referring to the process of making porridge as used conventionally, grains like rice are heated with an amount of water in the range of 6 to 7 times with respect to the rice amount until the grains become thick. For example, rice is put and cooked in the water made by boiling and straining mung beans or red beans, rice is put and cooked in the water made by boiling and grinding beans, and rice powder is mixed with all kinds of nut powder and cooked with the addition of water. In case of meat porridge, also, meat is minced, seasoned and roasted and then, rice is put and cooked with the roasted meat, or rice is put and cooked in soup that is made after well boiling and cooked with the very small pieces of meat.

However, the conventional porridge making method requires a relatively long period of time in keeping the grains or vegetables soaked in water, and it is inconvenient to keep porridge stirred while being boiled in order not to make it scorched. In addition, in the case where the time for making the grains soaked in water is erroneously manipulated or where the amount of water is erroneously put, there is a problem that the taste of the porridge is not good.

SUMMARY OF THE INVENTION

Accordingly, the present invention has been made in view of the above-mentioned problems occurring in the prior art.

An object of the present invention is to provide a domestic porridge making appliance and a method for making porridge by using the same that is capable of making porridge in more convenient and easier ways and substantially reducing the time required in making the porridge as compared with conventional methods.

To accomplish the above object, according to an aspect of the present invention, there is provided a domestic porridge making appliance comprising a generally cylindrical cooking vessel into which a predetermined amount of water and porridge ingredients are put and having an upper side opened, a vessel handle grip formed at one side thereof for moving the cooking vessel, and a locking part mounted at both ends of the opened upper side thereof, respectively, and a driving part having a lower surface formed to correspond to the opened upper side of the cooking vessel, a locking protrusion formed at a position corresponding to the locking part of the cooking vessel at both ends of the outer peripheral surface thereof, respectively, a motor disposed on the bottom surface thereof in such a manner as to be inserted into the inside of the cooking vessel, the motor having a pulverizing blade connected to an end of a rotating shaft thereof, a heater formed at the outside of the pulverizing blade for heating the water in the cooking vessel, and a controller formed at the inside thereof for controlling the motor and the heater.

Preferably, the said cooking vessel may take a generally cylindrical shape, being opened at the top side thereof, and comprise an outer tank forming an outer appearance thereof and an inner tank adapted to be closely contacted with the inside of the top side opened of the outer tank at the outside of the top end thereof and spaced by a predetermined distance from the inside of the outer tank to thereby form a space portion therebetween.

And, preferably, the said driving part may comprise an upper housing having a generally hemispherical outer shape opened on the bottom surface thereof with a stepped protrusion at the top side thereof, a handle grip for moving the driving part on the top surface thereof, the controller mounted at an inside thereof, and a control panel for manipulating the controller and a power supply for supplying power to the controller, the motor, and the heater, at the outside thereof and a lower housing having a top surface opened to correspond with the opened bottom side of the upper housing and a staged protrusion formed at the lower side of the opened top surface thereof, the staged protrusion being adapted to be coupled to a generally cylindrical motor mounting part into which the motor is disposed, the motor mounting part having a rotating shaft extended downwardly from the motor.

And, preferably, the said staged protrusion may be provided with a heater adapted to heat water put in the cooking vessel, at one side thereof and a sensor adapted to measure the temperatures and bubbling states of the water and the porridge ingredients in the cooking vessel, at the other side thereof.

And, preferably, at one sides of the said upper housing and the lower housing may be provided a steam discharging hole adapted to pass through the upper housing and the lower housing such that the steam generated from the water heated in the cooking vessel is discharged to the outside of the driving part.

And, preferably, the said control panel may comprise a selection button for selecting the kinds of porridge, a reservation button for reserving operation time, a heating button for keeping the prepared porridge warm at a predetermined temperature, a cleaning button for cleaning the appliance itself after making the porridge, a display on which time passed or time left during reservation, heating or making the porridge is displayed, and light emitting diodes for indicating the kind of porridge formed at one side of the selection button.

And, preferably, the said vessel handle grip may be provided with a sensing protrusion that is formed at a predetermined position of the top end thereof to correspond with an opening/closing switch of the driving part such that the opening/closing switch is operated by the operation of the sensing protrusion to sense the opening/closing state between the cooking vessel and the driving part.

To accomplish the above object, according to another aspect of the present invention, there is provided a method of making porridge by using a domestic porridge making appliance comprising the steps of: sensing the presence or absence of water in a cooking vessel under a control of a controller as a control panel is manipulated to operate the domestic porridge making appliance, and if it is sensed that the water is charged in the cooking vessel, going to next step, but if it is sensed that the water is not charged in the cooking vessel, generating a warning sound and returning to an initial step; measuring a temperature of the water in the cooking vessel and if the temperature of the water is higher than a temperature set therein, being subjected to a soaking step where porridge ingredients are soaked for stand-by time set therein; if it is sensed that the water is charged in the cooking vessel, applying power supplied from a power supply to a heater and heating the water charged in the cooking vessel; sensing bubbles generated when the water is boiled as the heater is operated and the temperature of the water boiled to thereby transmit the sensed result to the controller and counting the operation time of the heater and at the same time controlling the operation of the heater; maintaining a stand-by state until the operation time of the heater reaches set operation time; applying the power to a motor to thereby carry out a first pulverization step for about 15 to 25 seconds for the porridge ingredients in the cooking vessel by using a pulverizing blade mounted on a rotating shaft of the motor and being subjected to be in a stand-by state for about 2 minutes; operating the motor for about 15 to 25 seconds to thereby carry out a second pulverization step for the porridge ingredients and being subjected to be in a stand-by state for about 5 to 15 seconds, which is conducted repeatedly about 4 to 6 times; and being subjected to be in a stand-by state for about 4 to 5 minutes to thereby make the porridge ingredients well cooked.

Preferably, the said heater control step further comprises: a first heater control step of stopping the operation of the heater when the water charged in the cooking vessel is boiled to generate bubbles and if the bubbles are not sensed, keeping the heater operated to measure the operation time of the heater; a second heater control step of continuously applying the power to the heater to thereby heat the water if the operation time of the heater does not reach the set operation time and cutting the power supplied to the heater to thereby stop the operation of the heater if the operation time of the heater reaches the set operation time; and a third heater control step of measuring the temperature of water boiled by the heater if the operation time of the heater does not reach the set operation time, cutting the power supplied to the heater to thereby stop the operation of the heater if the measured temperature of water reaches the set temperature (about 100° C.), and continuously applying the power to the heater to thereby keep heating of the water if the measured temperature of water does not reach the set temperature.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

The terms used in the present invention are defined in accordance with the functions made in the present invention, which may be varied according to the intention or practices of those people who work in the art, and therefore, it should be understood that they do not limit the technical components of the present invention.

Figure 1:
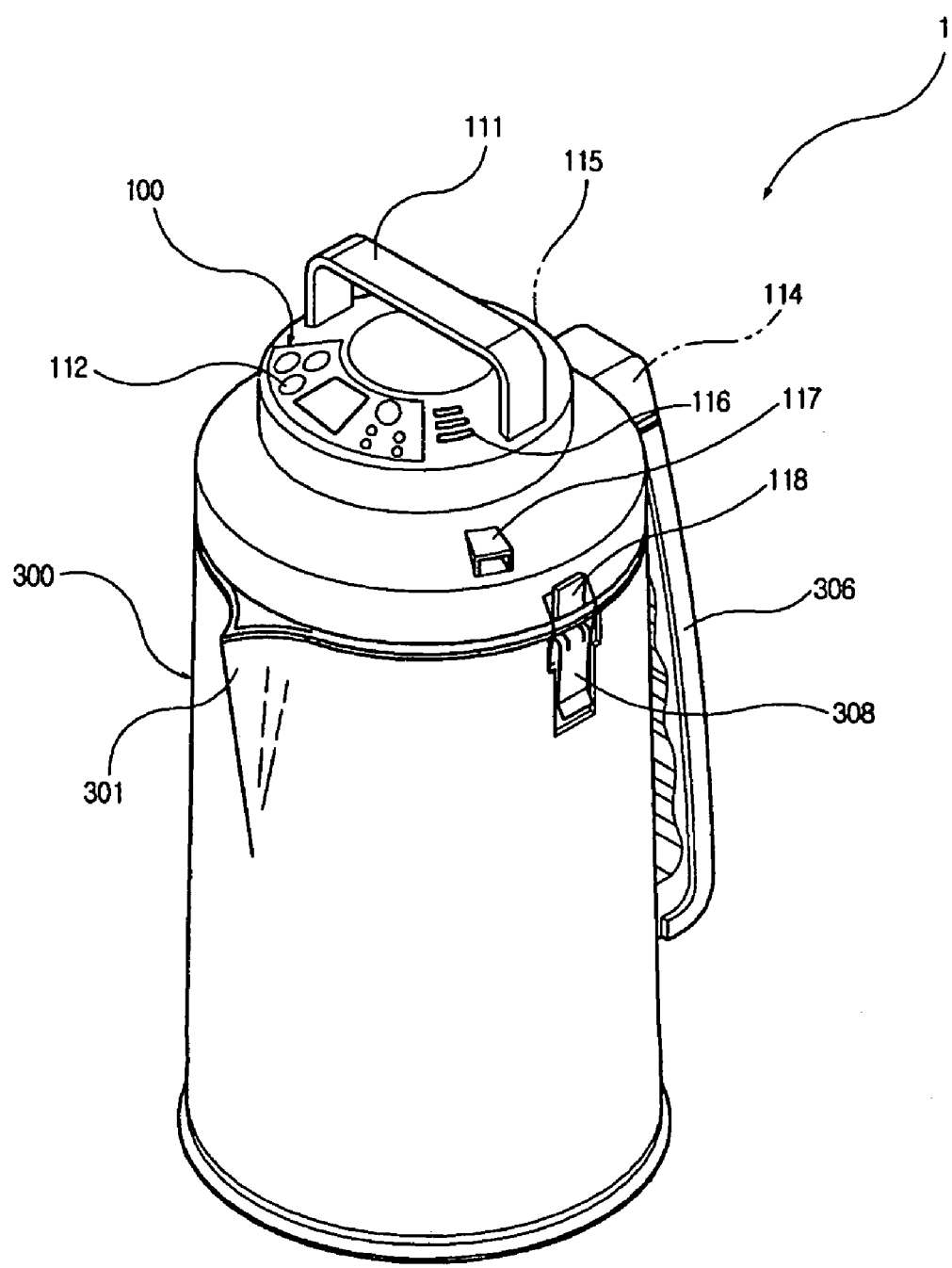
FIG. 1 is a perspective view of a domestic porridge making appliance according to the present invention.
Figure 2:
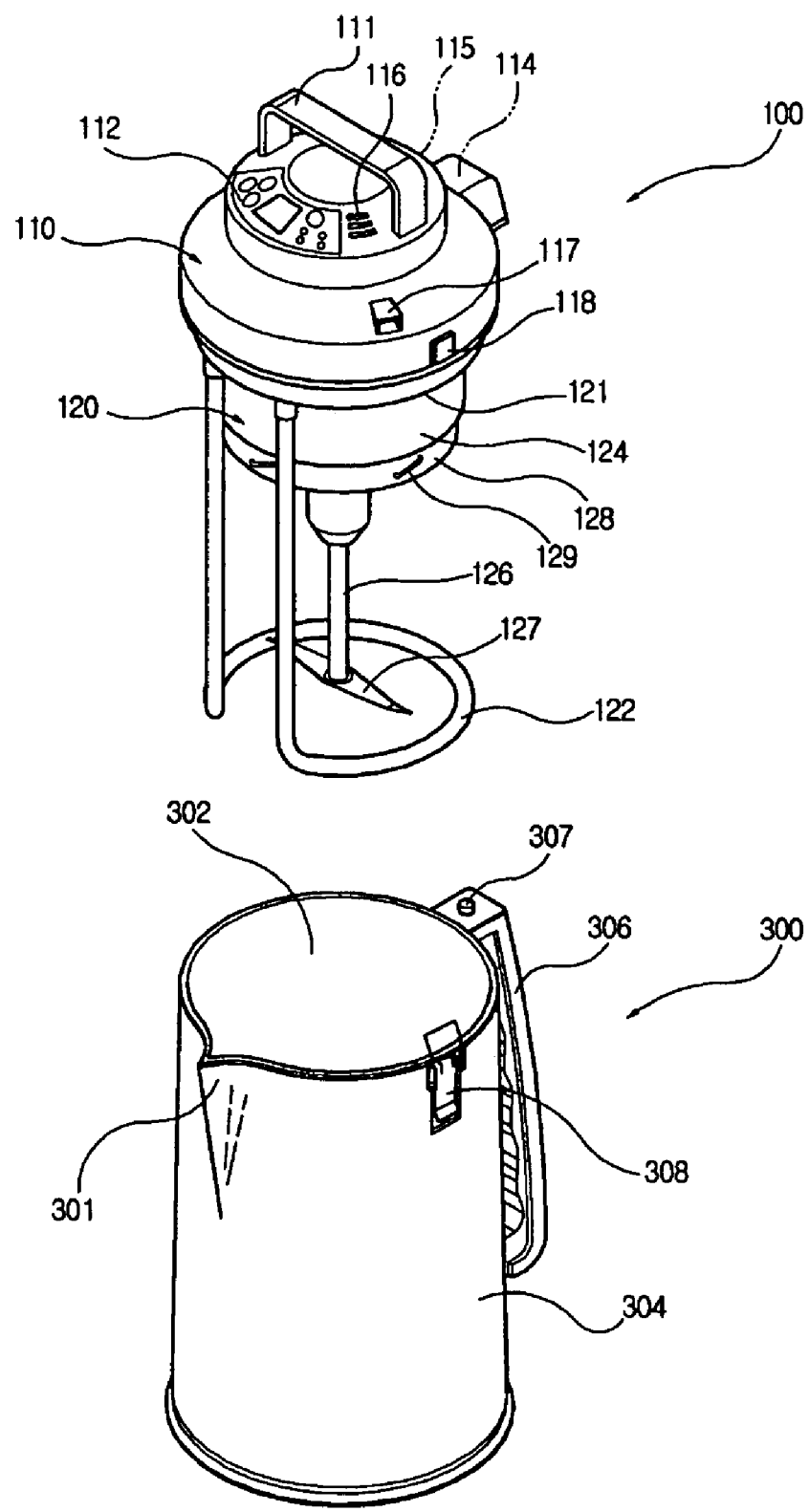
FIG. 2 is an exploded perspective view of the domestic porridge making appliance of this invention.
Figure 3:
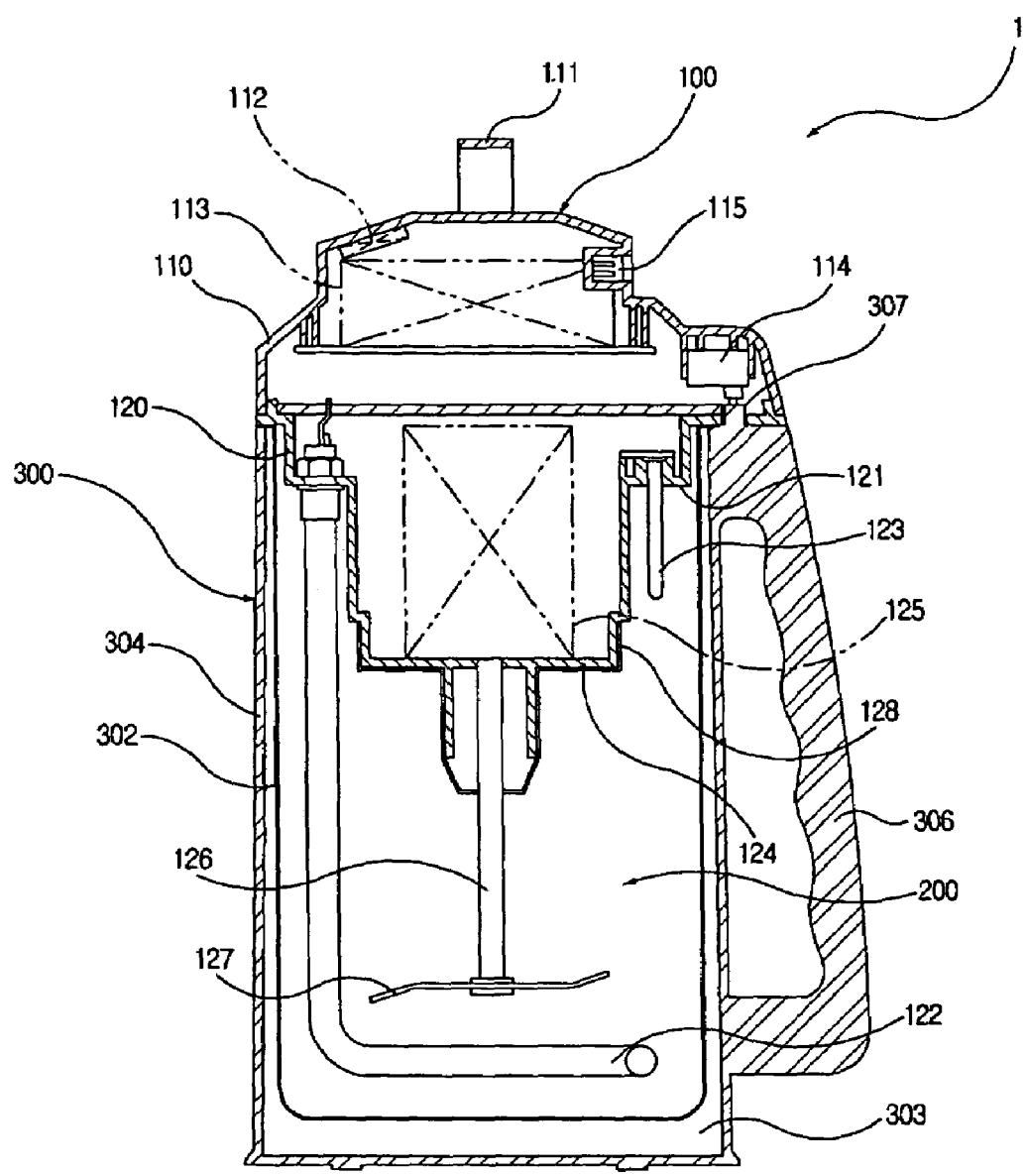
FIG. 3 is a sectional view of the internal structure of the domestic porridge making appliance of this invention.
Figure 4:
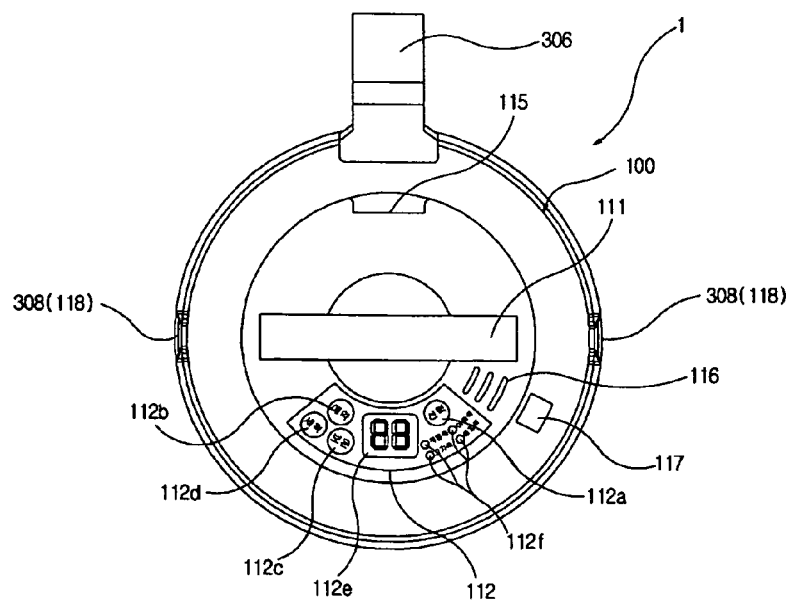
FIG. 4 is a plan view of the top surface of the domestic porridge making appliance of this invention.
Figure 5:
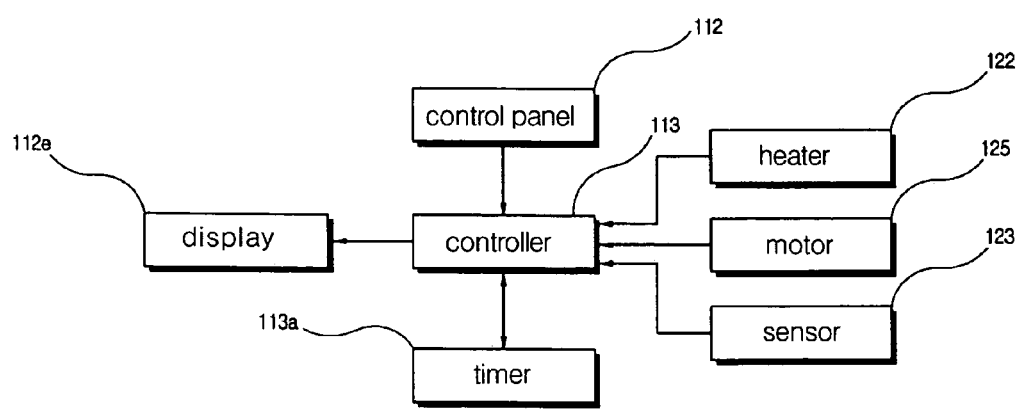
FIG. 5 is a block diagram of a configuration of a controller of the domestic porridge making appliance of this invention.

FIG. 1 is a perspective view of a domestic porridge making appliance according to the present invention, FIG. 2 is an exploded perspective view of the domestic porridge making appliance of this invention, FIG. 3 is a sectional view of the internal structure of the domestic porridge making appliance of this invention, FIG. 4 is a plan view of the top surface of the domestic porridge making appliance of this invention, and FIG. 5 is a block diagram of a configuration of a controller of the domestic porridge making appliance of this invention.

As shown, a domestic porridge making appliance 1 according to the present invention includes a driving part 100 in which a motor 125 and a controller 113 are housed, for pulverizing porridge ingredients (e.g., grains like soaked rice, beans, vegetables, meat, sea food and so on) and a cooking vessel 300 into which the porridge ingredients and water are put and pulverized by the driving part 100 detachably mounted thereto.

The driving part 100 includes an upper housing 110 that has a generally hemispherical outer shape opened on the bottom surface thereof with a stepped protrusion at the top side thereof, the upper housing having the controller 113 mounted at an inside thereof, and a lower housing 120 that is coupled to the opened portion of the upper housing 110 and has the motor 125 mounted downwardly therefrom.

In that way, the upper housing 110 is provided with a handle grip 111 for moving the driving part 100, on the top surface thereof and with the controller 113 in which a timer 113a is disposed for controlling each part of the domestic porridge making appliance 1 as time goes by, at the inside thereof. Also, the upper housing 110 is provided with a control panel 112 for manipulating the controller 113 and a power supply 115 for supplying power to the motor 125 and the controller 113.

The control panel 112 includes a selection button 112a for selecting grain porridge, meat porridge, vegetable porridge or sea food porridge, a reservation button 112b for reserving operation time, a heating button 112c for keeping the prepared porridge warm at a predetermined temperature, a cleaning button 112d for cleaning the appliance by itself after making the porridge, and a display 112e on which time passed or time left during reservation, heating or making the porridge is displayed.

So as to prepare porridge, in the case where the selection button 112a is pressed by a user, light emitting diodes 112f indicating the grain porridge, the meat porridge, the vegetable porridge and the sea food porridge that are disposed at one side of the selection button 112a start to generate the light sequentially, and as the selection button 112a, the reservation button 112b, the heating button 112c and the cleaning button 112d are pressed by the user, the time passed or the time left is displayed on the display 112e.

The upper housing 110 includes an opening/closing switch 114 that serves to sense the coupling state with the cooking vessel 300, at one side thereof. The upper housing 110 further includes a ventilating hole 116 that ejects the heat generated from the controller 113 and the motor 125 to the outside of the driving part 100, at a predetermined position of the top surface thereof, and a locking protrusion 118 that is formed in such a manner as to be locked onto the cooking vessel 300, at both end portions of the outer peripheral surface thereof.

The lower housing 120 has an upper side opened to correspond with the opened bottom side of the upper housing 110 and has a staged protrusion 121 formed at the lower side of the opened upper surface thereof, the staged protrusion 121 adapted to be coupled to a generally cylindrical motor mounting part 124 into which the motor 125 is disposed. The motor mounting part 124 has a rotating shaft 126 extended downwardly from the motor 125, and the rotating shaft 126 has a pulverizing blade 127 mounted at the end portion thereof, the pulverizing blade 127 serving to pulverize the porridge ingredients to a predetermined size.

In this case, the pulverizing blade 127 is directly connected to the rotating shaft 126 extended from the motor 125, or it may be fixed to the end portion of a rotating shaft extended from the rotating shaft 126 connected to the motor 125 by means of a coupling (which is not shown in the drawing) for the purpose of preventing the noises and overload caused from the motor 125.

The staged protrusion 121 is provided with a heater 122 that is adapted to heat water put in the cooking vessel 300 to thereby boil the porridge ingredients, at one side thereof, and a sensor 123 that is adapted to measure the temperatures and the bubbling states of the water and the porridge ingredients in the cooking vessel 300, at the other side thereof.

At one sides of the upper housing 110 and the lower housing 120 is provided a steam discharging hole 117 that is adapted to pass through the upper housing 110 and the lower housing 120 such that the steam generated from the water heated in the cooking vessel 300 is discharged to the outside of the driving part 100.

The cooking vessel 300 takes a generally cylindrical shape and has an opened upper portion into which the driving part 100 is mounted. The cooking vessel 300 includes an inner tank 302 that is provided at the inside thereof, an outer tank 304 that is coupled to the outside of the inner tank 302 to thereby form an outer appearance thereof, a vessel handle grip 306 that is formed at one side of the outer tank 304 for moving the cooking vessel 300, and a discharging passage 301 that is protrudedly opened at a position opposite to the vessel handle grip 306, for discharging the contents put in the cooking vessel 300 and the steam generated from the contents heated in the cooking vessel 300.

In this case, the inner tank 302 is made of metal or synthetic resin having excellent strength and heat-resistance properties, and it is formed to a shape corresponding to the lower side shape of the driving part 100, at the top end portion thereof such that it is closely contacted with the outer tank 304, while maintaining an airtight relation with the outer tank 304, and it is also formed to be spaced by a predetermined distance from the outer tank 304 such that it has a heating performance.

The vessel handle grip 306 is provided with a sensing protrusion 307 that is formed at a predetermined position of the top end thereof to correspond with the opening/closing switch 114 of the driving part 100, and thus, when the driving part 100 is mounted into the cooking vessel 300, the sensing protrusion 307 serves to sense the operation of the opening/closing switch 114. Also, the outer tank 304 is provided with locking parts 308 that are formed on both end portions of the outside of the top end thereof in such a manner as to be placed at the positions corresponding to the locking protrusions 118 that are formed on both end portions of the upper housing 110 of the driving part 100 with a result of being locked to the locking protrusions 118 to thereby make the driving part 100 forcedly fixed to the cooking vessel 300.

Now, an explanation of the process of making porridge by using the domestic porridge making appliance according to the present invention will be given in detail.

Figure 6:
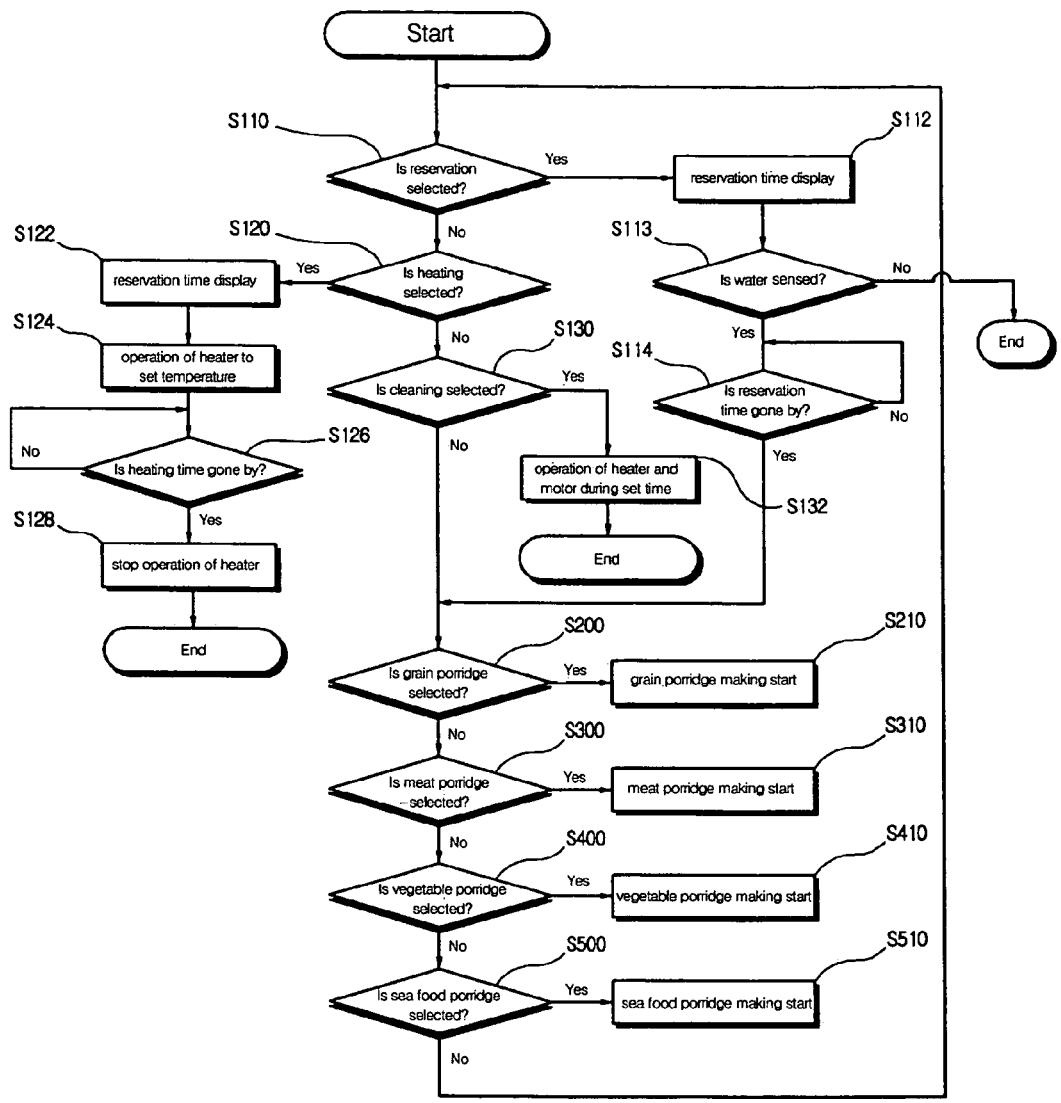
FIG. 6 is a flowchart showing the operation procedure of the domestic porridge making appliance of this invention.

FIG. 6 is a flowchart showing the operation procedure of the domestic porridge making appliance of this invention.

First of all, porridge ingredients like soaked rice, other grains, meat, vegetables, sea foods and a predetermined amount of water are put in the inner tank 302 of the cooking vessel 300, and the driving part 100 is then mounted and coupled to the cooking vessel 300.

So as to completely fix the driving part 100 to the cooking vessel 300, at that time, the locking parts 308 that are provided on both top ends of the cooking vessel 300 are locked to the locking protrusions 118 that are disposed on both ends of the driving part 100. Thereby, the sensing protrusion 307 that is formed at the top end of the vessel handle grip 306 becomes in contact with the opening/closing switch 114 of the driving part 100 to thereby operate the opening/closing switch 114.

In this case, the control panel 112 on the top surface of the driving part 100 is manipulated by a user for operating the porridge making appliance 1. To do this, one of the selection button 112a, the reservation button 112b, the heating button 112c and the cleaning button 112d on the control panel 112 is selected by him or her.

If the reservation button 112b and the selection button 112a are simultaneously pressed after the porridge ingredients and water are put in the cooking vessel 300 (at step S110), the controller 113 displays the time to start the operation on the display 112e and at that time, if the reservation button 112b is continuously pressed, it increases or decreases the expected time for the operation to thereby display the time finally set on the display 112e (at step S112). The controller 113 senses the presence and absence of water in the cooking vessel 300 and is returned to its initial step, if it is sensed that the water is not enough or no water is therein (at step S113). Then, if the reservation time elapses, the porridge making steps as will be discussed below are processed.

If the heating button 112c is pressed to keep the porridge after making warm in the cooking vessel 300 (at step S120), the controller 113 displays the heating time on the display 112e, and at that time, if the heating button 112c is continuously pressed, it increases or decreases the heating time for the porridge to thereby display the time finally set on the display 112e (at step S122). The controller 113 applies power to the heater 122 to operate the heater 122 at a predetermined set temperature (at step S126) such that the porridge in the cooking vessel 300 can be kept at the predetermined set temperature. After that, if the heating maintaining time elapses, the controller 113 cuts the power being supplied to the heater 122 to thereby stop the heating operation (at step S128).

If the cleaning button 112d is pressed after water is poured into the cooking vessel 300 (at step S130), the controller 113 applies the power to the heater 122 to boil the water in the cooking vessel 300, and also applies the power to the motor 125 for a predetermined period of time to thereby rotate the pulverizing blade 127 (at step S132), with a result that as the pulverizing blade 127 is rotated, the water in the cooking vessel 300 is rotated to thereby make the pulverizing blade 127 and the cooking vessel 300 all cleaned.

If the selection button 112a is pressed after the porridge ingredients and water are put in the cooking vessel 300, the light emitting diodes 112f indicating the grain porridge, the meat porridge, the vegetable porridge and the sea food porridge that are disposed at one side of the selection button 112a start to generate the light sequentially. At that time, if a desired porridge kind is selected, the controller 113 starts to carry out the operation of making the desired porridge.

In this case, the controller 113 sets the heating time and the pulverizing time by the porridge ingredients in accordance with the selected porridge kinds, and based upon the set time, it starts to pulverize and heat the porridge ingredients in the cooking vessel 300.

After the selection of the desired porridge kind, the controller 113 senses the presence or absence of the water between the heater 122 and the pulverizing blade 127 of the driving part 100, and if the presence of water is sensed, it operates the heater 122 for the predetermined period of time to heat the water in the cooking vessel 300. At that time, the steam generated when the water is boiled is discharged through the steam discharging hole 117 on the driving part 100.

And, the controller 113 operates the motor 125 to thereby pulverize the porridge ingredients in the cooking vessel 300 by using the pulverizing blade 127 at the inside of the cooking vessel 300 and heats the pulverized mixture to thereby complete the desired porridge making operation.

Hereinafter, an explanation of the process of making the porridge by using the domestic porridge making appliance of this invention will be given in detail.

Figure 7:
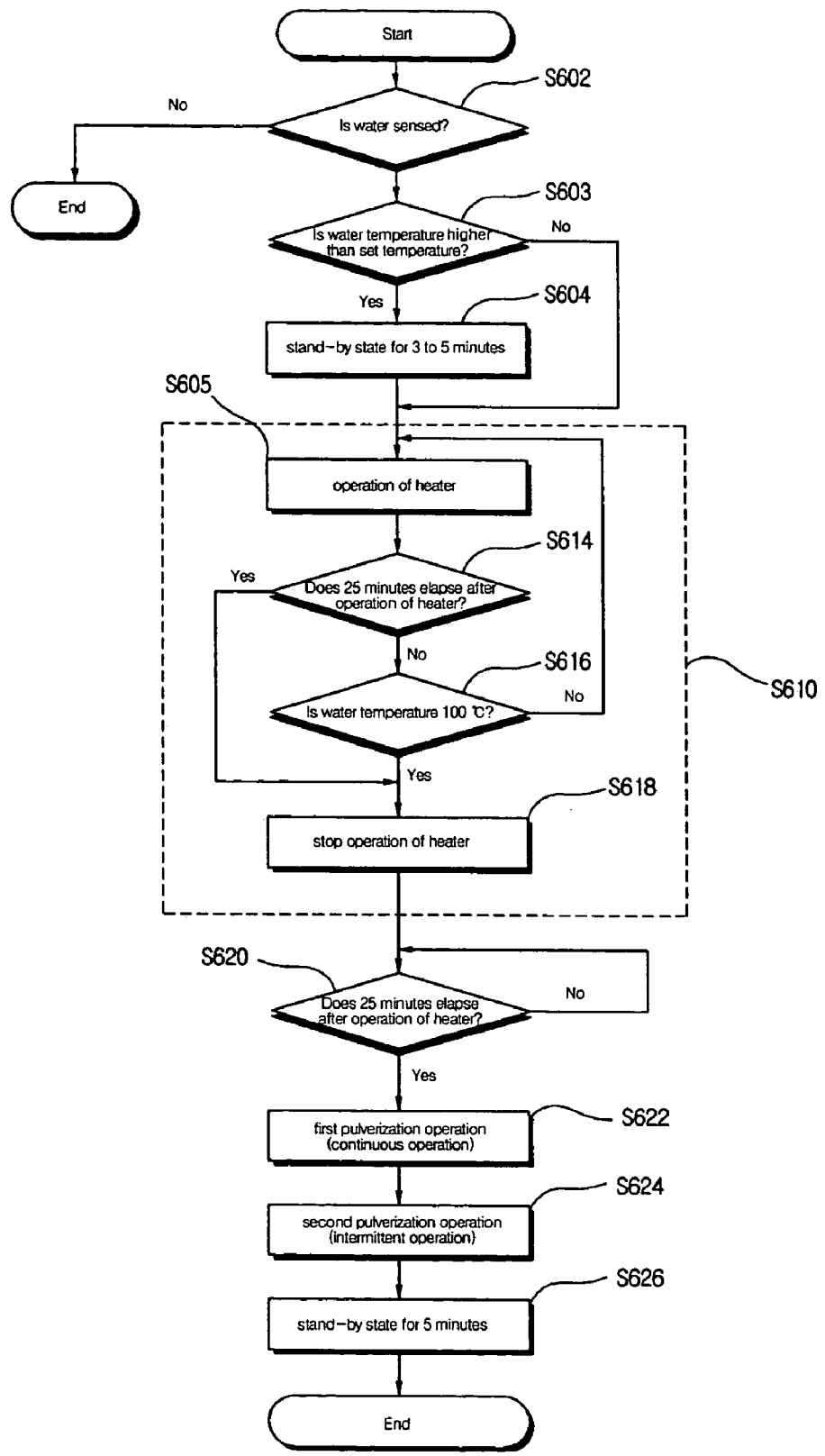
FIG. 7 is a flowchart showing the process of making porridge by using the domestic porridge making appliance of this invention.

FIG. 7 is a flowchart showing the process of making porridge by using the domestic porridge making appliance of this invention.

In the case where the selection button 112a is pressed to select a desired porridge kind or where the reservation time elapses after the reservation button 112b is pressed, the controller 113 senses the presence or absence of water in the cooking vessel 300 (at step S602).

If it is sensed that the water is not charged in the cooking vessel 300, at that time, the controller 113 generates a warning sound and is then returned to its initial state. On the other hand, if it is sensed that the water is charged in the cooking vessel 300, the controller 113 measures a temperature of the water (at step S603). In this case, if the temperature of the water is higher than a temperature set therein, the controller 113 is in a stand-by stage for time set therein such that the porridge ingredients are soaked in the water for the predetermined period of time (at step S604). Contrarily, if the temperature of the water is lower than the temperature set therein, the controller 113 applies the power supplied from the power supply 115 to the heater 122 to thereby operate the heater 122 (at step S605).

As the heater 122 is operated, the water that is charged in the cooking vessel 300 is heated and boiled, which is sensed by means of the sensor 123. Thus, the temperature of water boiled is transmitted to the controller 113. At that time, the controller 113 starts to carry out a heating step (at step S610) wherein the operation time of the heater 122 is counted and at the same time the operation of the heater 122 is controlled.

In this case, if the operation time of the heater 122 does not reach the time set therein, the controller 113 continuously applies the power to the heater 122 to keep the water boiled, and contrarily, if the operation time of the heater 122 reaches the time set therein, the controller 113 makes the heater 122 kept at a predetermined temperature for about 30 seconds and then cuts the power supply to the heater 122 to thereby stop operating the heater 122 (at step S618).

Also, if the operation time of the heater 122 does not reach the time set therein, the controller 113 measures the temperature of water boiled by the heater 122 and if it is sensed that the temperature of water reaches a set temperature, the controller 113 makes the heater 122 kept at the predetermined temperature for about 30 seconds and then cuts the power supply to the heater 122 to thereby stop operating the heater 122 (at step S618). On the other hand, if the temperature of water does not reach the set temperature, the controller 113 continuously applies the power to the heater 122 to thereby heat the water to the set temperature (at step S616).

Even though the operation of the heater 122 stops by the above conditions (at step S618), if the operation time of the heater 112 is shorter than the set time, the stand-by state is kept until the operation time of the heater 122 reaches the set operation time (at step S620).

After the heating step (at step S610), the controller 113 applies the power to the motor 125 to thereby carry out a first pulverization step for the porridge ingredients in the cooking vessel 300 by using the pulverizing blade 127 mounted on the rotating shaft 126 of the motor 125 at the inside of the cooking vessel 300 (at step S622). During the first pulverization step, the motor 125 is operated for about 20 seconds and has stand-by time for about 1 to 3 minutes. In this case, the operation time of the motor 125 is varied in accordance with the kinds of porridge.

After the first pulverization step, the controller 113 carries out a second pulverization step where the motor 125 is operated for about 20 seconds and takes stand-by time for about 10 seconds, which is conducted repeatedly about 4 to 6 times (at step S624), and then, the controller 113 takes stand-by time for about 5 minutes (at step S626), thereby completing the operation of making the porridge.

In this case, the heating step (step S610) and the first and second pulverization steps (steps S622 and S624) may be carried out reversely or repeatedly in accordance with the porridge ingredients.

As clearly appreciated from the foregoing, there is provided a domestic porridge making appliance and a method for making porridge by using the same wherein a pulverizing means for pulverizing all kinds of grains like rice as one of main ingredients of the porridge together with various vegetables and a heating means for heating water and porridge ingredients are formed integrally with each other, thereby making it possible to prepare the porridge in a more convenient way.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A domestic porridge making appliance comprising:

a generally cylindrical cooking vessel into which a predetermined amount of water and porridge ingredients are put and having an upper side opened, a vessel handle grip formed at one side thereof for moving the cooking vessel, and a locking part mounted at both ends of the opened upper side thereof, respectively; and a driving part having an upper housing and a lower housing formed under the upper housing, wherein a lower surface of the lower housing is matched with the opened upper side of the cooking vessel, a locking protrusion formed at a location corresponding to the locking part of the cooking vessel in both ends of the upper housing, a motor disposed on the bottom surface thereof in such a manner as to be inserted into the inside of the cooking vessel, the motor having a pulverizing blade connected to an end of a rotating shaft thereof, a heater formed at the outside of the pulverizing blade for heating the water in the cooking vessel, and a controller formed at the inside thereof for controlling the motor and the heater, and wherein the vessel handle grip is provided with a sensing protrusion formed at a predetermined position of a top end thereof to correspond with an opening/closing switch of the driving part such that the opening/closing switch is operated by the operation of the sensing protrusion to sense the opening/closing state between the cooking vessel and the driving part.

2. A domestic porridge making appliance according to claim 1, wherein the cooking vessel takes a generally cylindrical shape, being opened at the top side thereof, and comprises an outer tank forming an outer appearance thereof and an inner tank adapted to be closely contacted with the inside of the top side opened of the outer tank at the outside of the top end thereof and spaced by a predetermined distance from the inside of the outer tank to thereby form a space portion therebetween.

3. A domestic porridge making appliance according to claim 1, wherein the driving part comprises an upper housing having a generally hemispherical outer shape opened on the bottom surface thereof with a stepped protrusion at the top side thereof, a handle grip for moving the driving part on the top surface thereof, the controller mounted at an inside thereof, and a control panel for manipulating the controller and a power supply for supplying power to the controller, the motor, and the heater, at the outside thereof and a lower housing having a top surface opened to correspond with the opened bottom side of the upper housing and a staged protrusion formed at the lower side of the opened top surface thereof, the staged protrusion being adapted to be coupled to a generally cylindrical motor mounting part into which the motor is disposed, the motor mounting part having a rotating shaft extended downwardly from the motor.

4. A domestic porridge making appliance according to claim 3, wherein the staged protrusion is provided with a heater adapted to heat water put in the cooking vessel, at one side thereof and a sensor adapted to measure the temperatures and bubbling states of the water and the porridge ingredients in the cooking vessel, at the other side thereof.

5. A domestic porridge making appliance according to claim 3, wherein at one sides of the upper housing and the lower housing is provided a steam discharging hole adapted to pass through the upper housing and the lower housing such that the steam generated from the water heated in the cooking vessel is discharged to the outside of the driving part.

* * * * *